Figure 1:
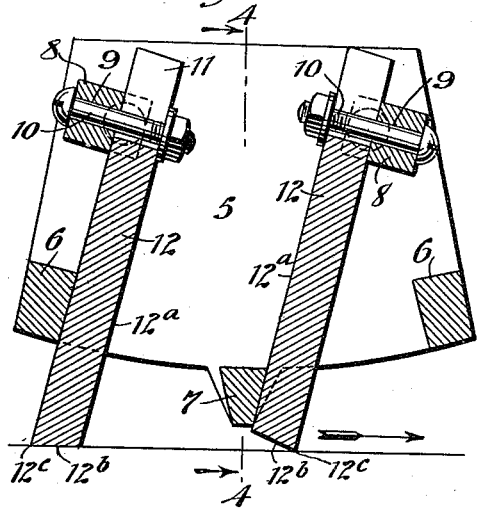

H. A. TUCKETT & V. A. HELLSTROM.
SCRAPER.
APPLICATION FILED AUG. 26, 1914.

1,143,465.

Patented June 15, 1915.

WITNESSES
Edw. Thorpe
E. B. Marshall

INVENTORS
Henry A. Tuckett
Victor A. Hellstrom
BY
Munn & Co.
ATTORNEYS

UNITED STATES PATENT OFFICE.

HENRY AUGUSTUS TUCKETT AND VICTOR A. HELLSTROM, OF SALT LAKE CITY, UTAH.

SCRAPER.

1,143,465.  Specification of Letters Patent.  Patented June 15, 1915.

Application filed August 26, 1914. Serial No. 858,633.

*To all whom it may concern:*

Be it known that we, HENRY A. TUCKETT, a citizen of the United States, and VICTOR A. HELLSTROM, a subject of the King of Sweden, and both residents of Salt Lake City, in the county of Salt Lake and State of Utah, have invented a new and Improved Scraper, of which the following is a full, clear, and exact description.

Our invention has for its object to provide a scraper with two pivoted blades, which may be operated back and forth, one of the blades having its cutting edge disposed against the surface being scraped for sharpening purposes while the other blade engages with the said surface.

Additional objects of the invention will appear in the following specification in which the preferred form of our invention is disclosed.

In the drawings similar reference characters refer to similar parts in all the views in which—

Figure 2:
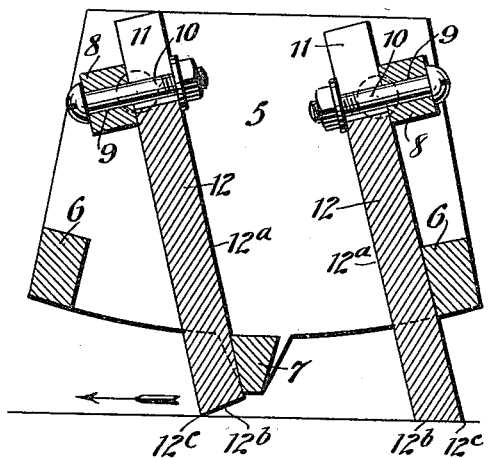
Figure 3:
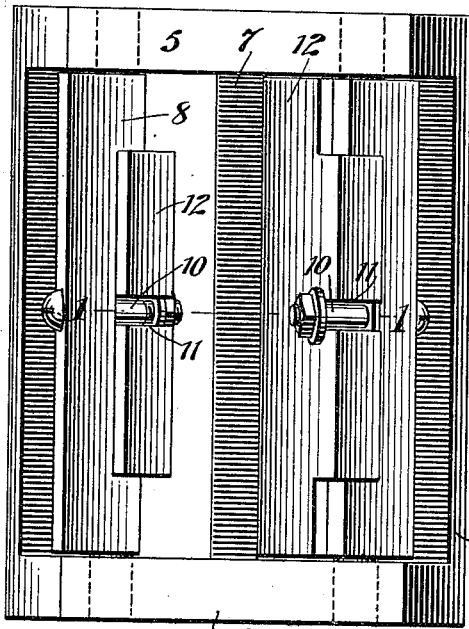
Figure 4:
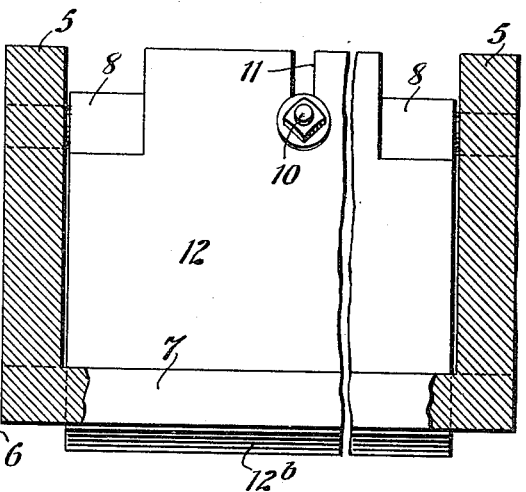

Figure 1 is a sectional elevation of the invention showing the position of the blades when the scraper is moving in one direction; Fig. 2 is a view similar to that shown in Fig. 1, but with the positions indicating how the blades are disposed when the scraper is moved in the opposite direction; Fig. 3 is a plan view of the invention; and Fig. 4 is a sectional view showing how the scraper blades are adjustably secured to the studs journaled in the frame.

By referring to the drawings it will be seen that a frame is provided having sides 5, side bars 6 engaging the said sides and a central bar 7, which also engages the sides 5, the sides of this central bar 7 converging outwardly. Journaled to the sides 5 of the frame there are studs 8 in which there are orifices 9, bolts 10 being disposed in the said orifices 9 and in slots 11 in the scraper blades 12 for adjustably securing the said scraper blades 12 to the studs 8, the said scraper blades 12 extending one at each side of the central bar 7, and each between the said central bar 7 and one of the side bars 6.

As will be seen by referring to Figs. 1 and 2 of the drawings, the inner sides $12^a$ and the ends $12^b$ of the scraper blades 12, form obtuse angles, so that when one of the scraper blades 12 is positioned to scrape the surface which is being treated, the companion scraper blade 12 will have its end $12^b$ disposed flat against the said surface for sharpening its cutting edge $12^c$.

It will be understood that with our scraper, the surface which is being treated, may be scraped when the scraper is moved in either direction and that at all times when one of the scraper blades is in operative position and is scraping the surface to be treated, the companion scraper blade will have its cutting edge sharpened to be used on the return stroke of the scraper.

Having thus described our invention we claim as new and desire to secure by Letters Patent:

1. In a scraper, a frame having two openings disposed side by side and two scraper blades, one extending through each of the openings and pivoted to the frame for engaging the frame at opposite sides of the openings.

2. In a scraper, a frame having two openings disposed side by side, two scraper blades pivoted on axes extending longitudinally of the openings, the blades extending through the openings with their outer terminals forming obtuse angles at their inner sides.

3. In a scraper, a frame having two openings disposed side by side, and two scraper blades, one extending through each of the openings and pivoted to the frame on axes extending longitudinally of the openings for engaging the frame at opposite sides of the openings.

4. In a scraper, a frame having three substantially parallel bars, two scraper blades pivoted to the frame on axes substantially parallel with the bars, the blades being separated by one of the bars and being each disposed between two of the bars, the outer end of each of the blades forming with its inner side an obtuse angle.

5. In a scraper, a frame having an opening, a scraper blade having a terminal projecting through the opening, the scraper blade being pivoted for striking the frame at opposite sides of the opening, the outer edge of the terminal forming with the side of the scraper an obtuse angle, the apex of which is substantially parallel with the axis of the scraper.

In testimony whereof we have signed our names to this specification in the presence of the two subscribing witnesses.

HENRY AUGUSTUS TUCKETT.
VICTOR A. HELLSTROM.

Witnesses as to the signature of Henry Augustus Tuckett:
    Oscar W. Moyle,
    Pearl James.

Witnesses as to the signature of Victor A. Hellstrom:
    G. A. Goates,
    E. L. Chipman.

Copies of this patent may be obtained for five cents each, by addressing the "Commissioner of Patents, Washington, D. C."